US008259913B2

(12) United States Patent
Wang

(10) Patent No.: US 8,259,913 B2
(45) Date of Patent: Sep. 4, 2012

(54) METHOD FOR ENHANCING PROCESSING PRIORITY, METHOD FOR IMPLEMENTING INTERACTIVE SERVICE, METHOD FOR GENERATING CUSTOMIZED IVR FLOW, AND CORRESPONDING APPARATUS AND SYSTEM

(75) Inventor: Xiaoli Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 434 days.

(21) Appl. No.: 12/604,011

(22) Filed: Oct. 22, 2009

(65) Prior Publication Data
US 2010/0104075 A1    Apr. 29, 2010

(30) Foreign Application Priority Data

Oct. 27, 2008 (CN) .......................... 2008 1 0171249

(51) Int. Cl.
H04M 1/64 (2006.01)
H04M 3/00 (2006.01)
(52) U.S. Cl. ................. 379/88.23; 379/265.01
(58) Field of Classification Search .... 379/88.18–88.23, 379/265.01–265.12; 704/256, 260, 270.1, 704/251, 4, 202; 705/14.36
See application file for complete search history.

(56) References Cited

U.S. PATENT DOCUMENTS

| 6,016,336 | A | 1/2000 | Hanson | |
|---|---|---|---|---|
| 6,061,433 | A | 5/2000 | Polcyn et al. | |
| 7,065,188 | B1 * | 6/2006 | Mei et al. | 379/88.23 |
| 7,136,804 | B2 * | 11/2006 | Lavallee et al. | 704/4 |
| 7,260,530 | B2 * | 8/2007 | Werner | 704/251 |
| 7,395,206 | B1 * | 7/2008 | Irwin et al. | 704/270 |
| 7,486,780 | B2 * | 2/2009 | Zirngibl et al. | 379/88.17 |
| 7,602,888 | B2 * | 10/2009 | Vu | 379/88.18 |
| 7,640,163 | B2 * | 12/2009 | Charney et al. | 704/270.1 |
| 7,751,552 | B2 * | 7/2010 | Bushey et al. | 379/265.12 |
| 7,907,719 | B2 * | 3/2011 | Bushey et al. | 379/265.01 |

(Continued)

FOREIGN PATENT DOCUMENTS

CN    101119416 A    2/2008

(Continued)

OTHER PUBLICATIONS

Office Action issued in corresponding Russian Patent Application No. 2009139489, mailed Dec. 15, 2010.

(Continued)

Primary Examiner — Mohammad Islam
(74) Attorney, Agent, or Firm — Brinks Hofer Gilson & Lione

(57) ABSTRACT

Embodiments of the present invention provide a method, apparatus and system for enhancing a processing priority. The method include: acquiring a predefined processing priority which includes a first priority and a second priority; and adjusting the first priority and/or the second priority to a third priority higher than the first priority and/or a fourth priority higher than the second priority respectively according to relevant information of a subscriber. The embodiments of the present invention adjust the processing priority of service according to the relevant information of the subscriber, to make the adjusted processing priority be higher than the predefined processing priority; therefore, it can provide different subscribers with customized service information providing sequences according to their operation habits, so as to simplify the procedure for service operation, shorten the time interval for service operation, and realize the customization for service operation.

7 Claims, 8 Drawing Sheets

U.S. PATENT DOCUMENTS

| | | | | |
|---|---|---|---|---|
| 7,908,143 B2 * | 3/2011 | Kankar et al. | ............... | 704/270 |
| 2005/0065913 A1 * | 3/2005 | Lillie et al. | ............... | 707/3 |
| 2005/0119878 A1 * | 6/2005 | Haenel et al. | ............... | 704/202 |
| 2005/0246174 A1 * | 11/2005 | DeGolia | ............... | 704/270 |
| 2008/0126098 A1 * | 5/2008 | Deng et al. | ............... | 704/270.1 |
| 2008/0195471 A1 * | 8/2008 | Dube et al. | ............... | 705/14 |

FOREIGN PATENT DOCUMENTS

| | | |
|---|---|---|
| EP | 1916804 A1 | 4/2008 |
| KR | 2007-0113431 | 11/2007 |
| KR | 1020080048802 A | 6/2008 |
| KR | 1020080086673 A | 9/2008 |

OTHER PUBLICATIONS

Office Action issued in corresponding Russian Patent Application No. RU2009139489, mailed Dec. 15, 2010.

Office Action issued in corresponding Chinese Patent Application No. 200810171249.3, mailed Sep. 26, 2011.

Office Action issued in corresponding European Patent Application No. 09174215.5, mailed Aug. 16, 2011.

Office Action issued in corresponding Korean Patent Application No. 10-2009-0101775, mailed Apr. 12, 2011.

* cited by examiner

METHOD FOR ENHANCING PROCESSING PRIORITY, METHOD FOR IMPLEMENTING INTERACTIVE SERVICE, METHOD FOR GENERATING CUSTOMIZED IVR FLOW, AND CORRESPONDING APPARATUS AND SYSTEM

CROSS REFERENCE TO RELATED APPLICATIONS

This application claims priority to Chinese Patent Application No. 200810171249.3, filed on Oct. 27, 2008, the contents of which is incorporated by reference herein in its entirety.

FIELD OF THE PRESENT INVENTION

The present invention relates to the field of communication, and more particularly, to a method for enhancing processing priority, a method for implementing an interactive service, a method for generating a customized IVR flow, and corresponding apparatus and system.

BACKGROUND

Interactive service providing method is widely used in many industries, such as Interactive Voice Response (IVR) system, Internet Protocol Television (IPTV), telephone bank and so on, because it has many advantages such as convenient operations, good interactions, saving human resources and so on. In a conventional interactive service providing method, a service provider provides a subscriber with service information in a predefined sequence, while the subscriber may make no changes to the providing sequence of the service information and have to operate step by step under the prompts of the system until reaching the desired service information. For example, a conventional IVR system guides a use via voice prompts to select corresponding service information through telephone keys or voice step by step, and the subscriber has to perform multiple operations in order to reach the desired service information.

In developing the present invention, the inventor found there are at least the following problems in the conventional art.

The conventional interactive service providing method is unable to optimize its service flow according to the operating trajectory of each subscriber since the service flow is almost the same for all subscribers, so that the conventional interactive service providing method is complicated for the subscribers to operate and hard to be customized for individuals.

SUMMARY

Embodiments of the present invention provide a method for enhancing processing priority, a method for implementing an interactive service, a method for generating a customized IVR flow, and corresponding apparatus and system, in order to solve the problem of being unable to adjust the priority of the service in prior art, simplify the procedure for service operation, shorten the time interval for service operation, and realize the customization for service operation.

Embodiments of the present invention provide a method for implementing an interactive service, the method includes: receiving a communication link request from a subscriber; acquiring basic information of the subscriber; acquiring a customized Interactive Voice Response (IVR) flow of the subscriber based on the basic information, wherein the customized IVR flow being generated based on operating information of the subscriber; providing the interactive service to the subscriber according to positions of nodes in the customized IVR flow.

Embodiments of the present invention provide a method for generating a customized Interactive Voice Response (IVR) flow, the method includes: acquiring operating information of a subscriber; generating the customized IVR flow based on the operating information of the subscriber, in order for the subscriber to get an interactive service according to the customized IVR flow.

Embodiments of the present invention provide an apparatus for implementing an interactive service, the apparatus includes: a receiving module adapted to receive a communication link request from a subscriber; an acquiring module adapted to acquire basic information of the subscriber, and acquire a customized Interactive Voice Response (IVR) flow of the subscriber based on the basic information, wherein the customized IVR flow being generated based on operating information of the subscriber; a providing module adapted to provide the interactive service to the subscriber according to positions of nodes in the customized IVR flow.

Embodiments of the present invention provide an apparatus for generating a customized Interactive Voice Response (IVR) flow, the apparatus includes: an acquiring module adapted to acquire operating information of a subscriber; a generating module adapted to generate the customized IVR flow based on the operating information of the subscriber, in order for the subscriber to get an interactive service according to the customized IVR flow.

Embodiments of the present invention provide a system for interactive voice, the system includes an apparatus for implementing an interactive service, the apparatus is adapted to: receive a communication link request from a subscriber, send an inquiry request to an Interactive Voice Response (IVR) subscriber behavior analyzing platform to determine whether the subscriber has a customized IVR flow, wherein the customized IVR flow being generated based on operating information of the subscriber; receive the customized IVR flow, which is sent by the IVR subscriber behavior analyzing platform when the IVR subscriber behavior analyzing platform determines that the subscriber has the customized IVR flow; provide the interactive service to the subscriber according to the customized IVR flow, wherein the IVR subscriber behavior analyzing platform is adapted to receive the inquiry request from the apparatus for implementing an interactive service, and send the customized IVR flow to the apparatus for implementing an interactive service when determining that the subscriber has the customized IVR flow.

It can be seen from the above technical solutions that the embodiments of the present invention adjust the priority of service according to the relevant information of the subscriber, to make the adjusted priority be higher than the predefined priority; therefore, it can provide different subscribers with customized service information providing sequences according to their operation habits, so as to simplify the procedure for service operation, shorten the time interval for service operation, and realize the customization for service operation.

DETAILED DESCRIPTION

Figure 1:
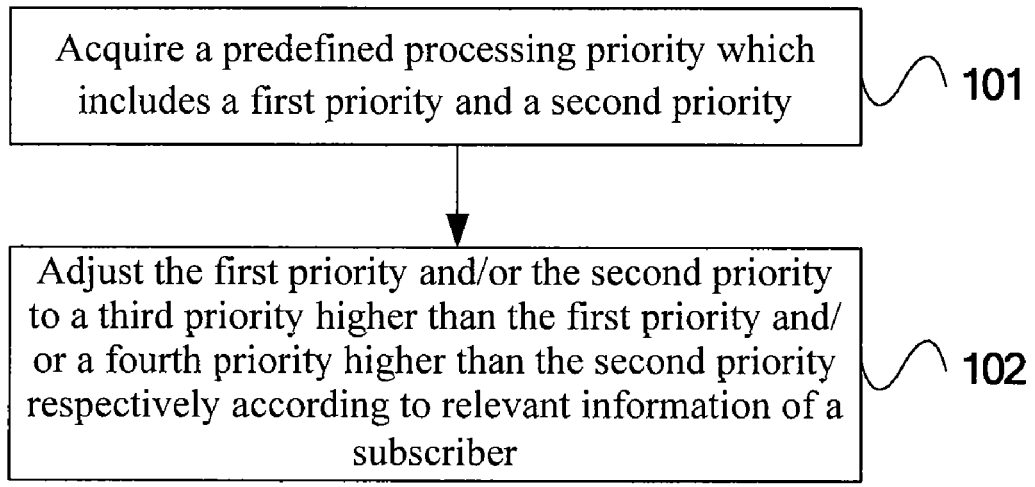
FIG. 1 is a flowchart of a method for enhancing a processing priority according to an embodiment of the present invention.

More detailed description of specific embodiments of the present invention will be given hereafter in conjunction with the drawing.

FIG. 1 is a flowchart of a method for enhancing a processing priority according to an embodiment of the present invention. As shown in FIG. 1, the embodiment includes the following steps.

Step 101: Acquiring a predefined processing priority which includes a first priority and a second priority.

Step 102: Adjusting the first priority to a third priority higher than the first priority, and/or adjusting the second priority to a fourth priority higher than the second priority according to relevant information of a subscriber.

The relevant information of the subscriber includes basic information of the subscriber and operating information of the subscriber. The basic information of the subscriber includes one or more of: brand of the subscriber, monthly consumption of the subscriber, consumption ability of the subscriber, age of the subscriber. The operating information of the subscriber includes one or more of: times of selecting a service corresponding to a predefined processing priority, durations of selecting a service corresponding to a predefined processing priority, a percentage of a ratio between the times and the durations of selecting a service corresponding to a single predefined processing priority to a ratio between the times and the durations of selecting services corresponding to all predefined processing priorities.

Moreover, the processing priorities in the embodiment may be processing priorities corresponding to IVR system services.

In the embodiment, a predefined processing priority is adjusted according to the relevant information of the subscriber so as to make the adjusted processing priority be higher than the predefined processing priority. In this way, it can provide different subscribers with customized service information providing sequences according to their operation habits, simplify the procedure for service operation, shorten the time period for service operation, and realize the customization for service operation.

Figure 2A:
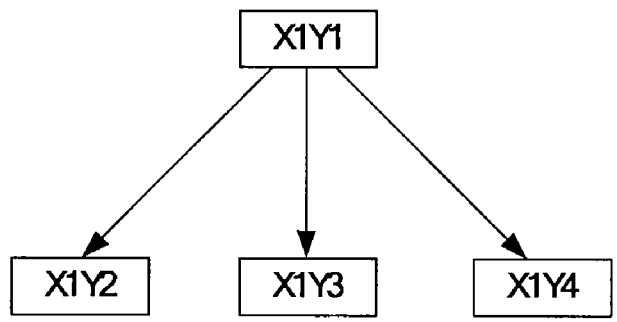
FIG. 2a is a tree diagram of processing priorities used in a method for enhancing a processing priority according to an embodiment of the present invention.

A method for enhancing a processing priority is provided in an embodiment of the present invention. In the embodiment, the service providing system may be an IVR subscriber behavior analyzing platform, processing priorities may be prioritized according to the sequence of nodes in an IVR flow tree, wherein the sequence of a node is determined by width information and key information in attribution information of the node. Then the first priority included in the processing priority may be the width information, the second priority included in the processing priority may be the key information. It should be noted that, in the embodiment, each IVR subscriber behavior analyzing platform includes at least one tree structure as shown in FIG. 2a. In an IVR system with more than one flow tree, after subscribers dial into an IVR self-help voice flow, subscribers in different states (e.g., registered or deregistered Coloring Ring subscribers) and different brands (e.g., Gotone subscribers or a M-zone subscribers of China Mobile) may enter different tree structures when entering the same IVR self-help voice flow. Each tree has a root node. Each non-leaf node has at least one child node. A tree may have a depth of any layers. The root node is a virtual node. The parent node of the first menu of the IVR self-help voice flow that a subscriber enters may be regarded as a virtual root node. The child nodes of each node compose of directory options or a set of contents under the node.

Figure 2B:
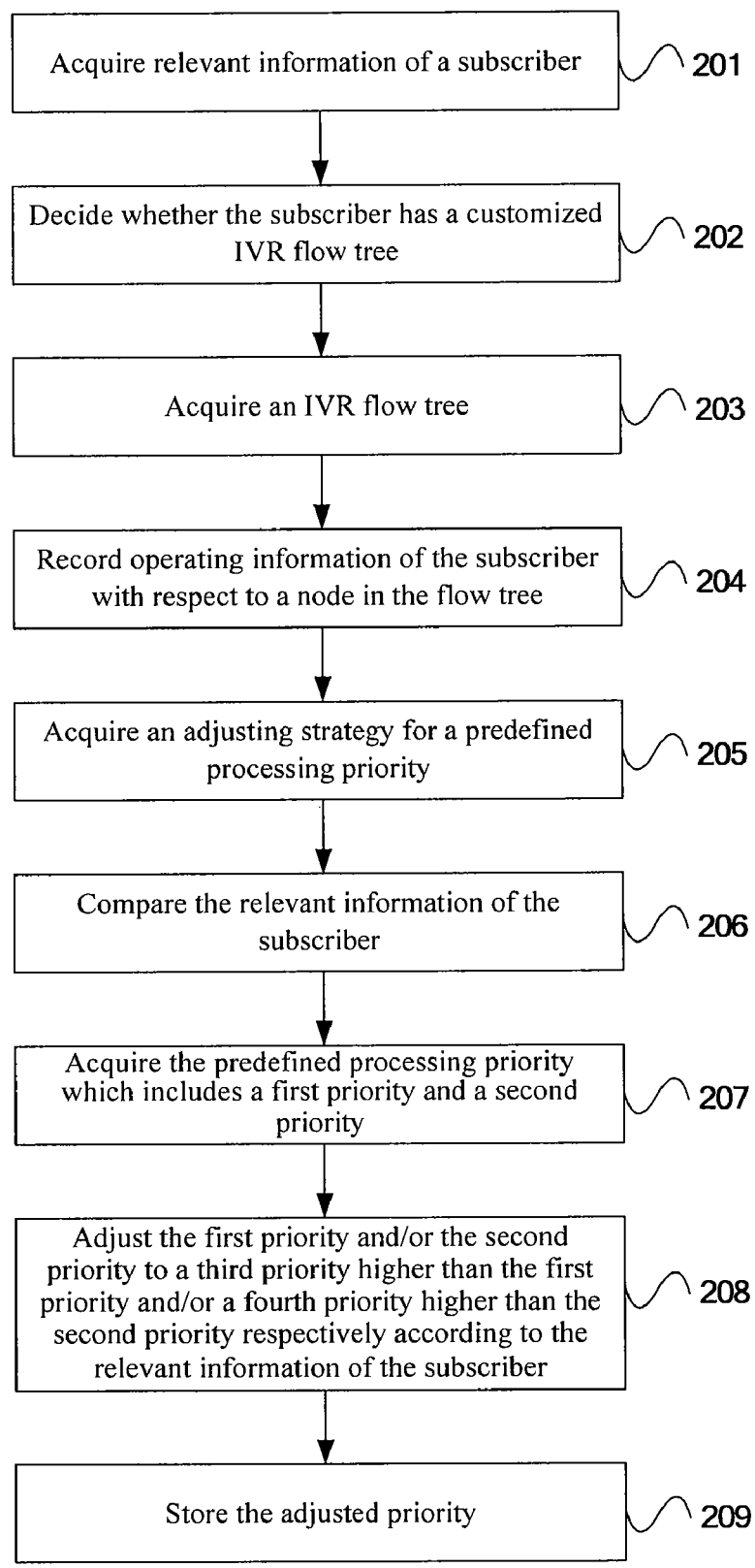
FIG. 2b is a flowchart of the method for enhancing a processing priority according to an embodiment of the present invention.

FIG. 2a is a tree diagram of processing priorities employed in the method for enhancing a processing priority according to the embodiment of the present invention. FIG. 2b is a flowchart of the method for enhancing a processing priority according to the embodiment of the present invention. As shown in table 1 and FIG. 2a, the service information X1Y1 in table 1 corresponds to the parent node X1Y1 in FIG. 2a, the service information X1Y2, X1Y3 and X1Y4 in table 1 correspond to the child nodes X1Y2, X1Y3 and X1Y4 in FIG. 2a respectively.

TABLE 1

An array of processing priorities used in the method for enhancing a processing priority according to the embodiment of the present invention

| X1Y1 | X1Y2 | X1Y3 | X1Y4 |
| X2Y1 | X2Y2 | X2Y3 | X2Y4 |
| X3Y1 | X3Y2 | X3Y3 | X3Y4 |

As shown in FIG. 2b, the embodiment of the present invention includes the following steps.

Step 201: Acquiring relevant information of a subscriber.

The relevant information of the subscriber includes basic information of the subscriber and operating information of the subscriber. The basic information of the subscriber includes, but is not limited to, one or more of: brand of the subscriber, monthly consumption of the subscriber, consumption ability of the subscriber, age of the subscriber, and frequency or the number of times that the subscriber used the IVR flow. The operating information of the subscriber is an operating trajectory of the subscriber recorded by the IVR subscriber behavior analyzing platform, and can be used to generate a customized IVR flow tree. The operating information of the subscriber includes, but is not limited to, one or more of: times of selecting a node, durations of staying at the node, or the percentage of the ratio of the times of selecting the node to the durations of staying at the node to the ratio of the times of selecting all nodes in the flow tree to the durations of staying at all the nodes.

In the IVR subscriber behavior analyzing platform, the relevant information of the subscriber may be acquired by retrieving information, which was recorded by the IVR subscriber behavior analyzing platform when the subscriber utilized the IVR subscriber behavior analyzing platform to inquire or handle a service, and the relevant information of the subscriber stored in the IVR subscriber behavior analyzing platform, and may also be acquired by retrieving the relevant information of the subscriber stored in other external IVR subscriber behavior analyzing platforms. The relevant information of the subscriber acquired from other external IVR subscriber behavior analyzing platforms is the data produced by other IVR subscriber behavior analyzing platforms, and may be derived from many ways such as questionnaire survey on subscribers, experience data of other external IVR subscriber behavior analyzing platforms and so on. The IVR subscriber behavior analyzing platform may introduce such data into its own database.

When the IVR subscriber behavior analyzing platform receives a communication link request from a subscriber terminal, it may receive an identifier of the subscriber terminal such as telephone number, IP address and so on. Alternatively, the subscriber may input through pressing keys its own information, such as card number, account number, identity card number or password and so on, when the subscriber uses the IVR subscriber behavior analyzing platform. The IVR subscriber behavior analyzing platform may get the relevant information of the subscriber by matching the identifier of the subscriber terminal or the information inputted by the subscriber.

Step 202: Deciding whether the subscriber has a customized IVR flow tree.

A standard IVR flow tree is the base for a customized IVR flow tree. The customized IVR flow tree may be achieved by adjusting the standard IVR flow tree according to the operating information of the subscriber. The adjustment includes latitudinal adjustment of a node and longitudinal adjustment of a node. For example, A is a subscriber having no customized IVR flow tree, and B is a subscriber having a customized IVR flow tree. In the case of entering an IVR flow tree with latitudinal adjustment of a node being enabled, the flow entered after the subscriber A dials an IVR access number is a standard voice flow, i.e. the flow is identical to the flow shown in the flowchart. On the other hand, after the subscriber B dials the IVR access number, the subscriber is prompted to press x if he wants to enter the standard flow, and the default option is to enter a customized flow. In the customized flow, the subscriber is not requested to select a language (the system has recorded the language of the subscriber), and the main menu is rearranged according to the operating habit of the subscriber with the habitual option being arranged at the first place. In the case of entering an IVR flow tree with longitudinal adjustment of a node being enabled, taking the flow of setting a coloring ring as an example, after the subscriber A downloads a coloring ring successfully, the system prompts the subscriber to select among "1: setting the coloring ring; 2: downloading another coloring ring". When the subscriber selects 1, the subscriber is further prompted to select among "1: default coloring ring; 2: individual coloring ring; 3: group coloring ring", and the system may enter an actual coloring ring setting flow only after the further selection is made by the subscriber. It was most probable (the probability is no lower than a predefined value such as 50%) for the subscriber B to set a downloaded coloring ring as an individual coloring ring each time he downloaded the coloring ring; therefore, when the subscriber B downloads a coloring ring successfully, the system prompt may become "3: setting as individual coloring ring; 1: setting the coloring ring; 2: downloading another coloring ring", in this way, one selecting step of the subscriber may be avoided.

Whether a subscriber has a customized IVR flow tree is decided according to the relevant information of the subscriber. Particularly, items in the basic information of the subscriber are combined as a deciding condition for performing the decision, for example, the brand used by the subscriber and the frequency of using the IVR flow by the subscriber as indicated in the basic information of the subscriber may be combined as the deciding condition. For example, the subscriber need to be a subscriber of Gotone and the number of monthly use times of the subscriber need to be larger than 5. Furthermore, assuming that the period for updating the IVR flow tree is one month and it is December now, and there are four subscribers A, B, C, D: A, B, C are subscribers of Gotone while D is not; A used the IVR flow more than 5 times in March and on longer used the IVR flow more than 5 times monthly in subsequent months; B never used the IVR flow more than 5 times monthly; and C used the IVR flow more than 5 times in every month. In the above case, there is no record for B or D in the customized IVR subscriber behavior analyzing platform; the customized IVR flow tree for A is constant from April to December, and is generated according to the use data of March; C has a respective customized IVR flow tree in each month from April to December, with the potentially different customized IVR flow tree used in each month being generated according to the use data of the previous month.

If the basic information of the subscriber conforms to the deciding condition, the subscriber has a customized IVR flow tree. If one or more items in the basic information of the subscriber do not conform to the deciding condition, a standard IVR flow tree is presented to the subscriber. After the decision is made, the IVR subscriber behavior analyzing platform returns the deciding result to the subscriber terminal.

Further, in order to save system resources, if a subscriber has ever successfully possessed a customized IVR flow tree once, the IVR subscriber behavior analyzing platform may no longer perform the decision on whether the subscriber has a customized IVR flow tree thereafter.

Step 203: Acquiring an IVR flow tree.

According to the deciding result in step 202, the IVR subscriber behavior analyzing platform acquires attribution information of each node in the IVR flow tree of the subscriber, and the attribution information may include depth information, width information, key information, operating information of the subscriber, type information, and identification information of parent node. The IVR subscriber behavior analyzing platform reads the attribution information of each node in the IVR flow tree to provide the subscriber with corresponding IVR flow services.

It should be noted that the IVR subscriber behavior analyzing platform in the embodiment performs latitudinal adjustment on a node by adjusting the width information and/or the key information of the node.

There are various ways for the IVR subscriber behavior analyzing platform to make a subscriber enter a customized IVR flow tree. For example, the IVR subscriber behavior analyzing platform may let the subscriber select an IVR flow tree enter and then provide a corresponding IVR flow tree to the subscriber according to the subscriber's selection; the IVR subscriber behavior analyzing platform may provide a customized IVR flow tree to the subscriber directly without a selection by the subscriber; alternatively, when the subscriber is using a standard IVR flow tree or a customized IVR flow tree, the IVR subscriber behavior analyzing platform may provide a shortcut key for switching between the standard IVR flow tree and the customized IVR flow tree as required.

Furthermore, when the IVR subscriber behavior analyzing platform is acquiring the standard IVR flow tree or the customized IVR flow tree, the subscriber is enabled to switch between the standard IVR flow tree and the customized IVR flow tree.

Step 204: Recording operating information of the subscriber with respect to a node in the flow tree.

After the IVR subscriber behavior analyzing platform acquires an IVR flow tree corresponding to the subscriber, it provides inquiry and service information to the subscriber according to the position of each node in the IVR flow tree. When the subscriber uses the IVR flow tree, the IVR subscriber behavior analyzing platform may record the frequency of using each node by the subscriber; in particular, the frequency of using each node by the subscriber may be recorded in the subscriber's operating information of the attribution information of the node. For example, the operating trajectory of the subscriber on each node, including but not limited to historical keys, times of selecting the node, durations of staying at the node, is recorded in the IVR subscriber behavior analyzing platform as the relevant information of the subscriber.

Step 205: Acquiring an adjusting strategy for a predefined processing priority.

In particular, when an update period is reached, it is decided whether the brand of the subscriber, the monthly consumption of the subscriber, the consumption ability of the subscriber, the age of the subscriber, the frequency or the number of times that the subscriber utilized the IVR flow and so on in the basic information of the subscriber conform to predefined values. If the basic information of the subscriber conform to the predefined values, an adjusting strategy for a single node in the IVR flow tree is acquired to be used to adjust a first priority and/or a second priority to a third priority and/or a fourth priority respectively according to the relevant information of the subscriber.

The update period is predefined by a developer. The update period may be a period of time such as one week, one month, and may also be the number of login times of a subscriber, for example, the predefined processing priority is adjusted when the subscriber logs in for every fifth time. The adjusting strategy is predefined by the developer. The adjusting strategy includes three types: "unadjustable", "adjustable" and "latitudinal adjustment", or "adjustable" and "longitudinal adjustment". Each node corresponds uniquely to a type of adjusting strategy. For example, in a bank self-help voice system, the two nodes for requesting a subscriber to input card number and password respectively are "unadjustable" nodes. The node for deposit service and the node for transfer service may be predefined to be "adjustable" and "latitudinal adjustment", or predefined to be "adjustable" and "longitudinal adjustment" by the developer. For example, as shown in FIG. 2a, the original arrangement of the nodes in the same layer is "X1Y1", "X1Y3, "X1Y4". The adjusting strategies of the three nodes are "adjustable" and "latitudinal adjustment". Therefore, the sequence of the three nodes may be rearranged in any way according to a subscriber's operating habit. For example, as shown in FIG. 2a, the adjusting strategy of the node "X1Y2" is "adjustable" and "longitudinal adjustment", and the node "X1Y2" may be adjusted to a position at the same depth as the node "X1Y1" according to a subscriber's operating habit.

Furthermore, in the adjusting strategy of "adjustable" and "longitudinal adjustment", the depth of a node may be adjusted upwards for at least one position.

Furthermore, if one or more items in the basic information of the subscriber do not conform to the predefined values, the operation is terminated.

Step 206: Comparing the relevant information of the subscriber.

The developer may predefine a comparing strategy, i.e., an advantage comparing condition.

In particular, operating information of a subscriber on a predefined processing priority is compared with another operating information of the subscriber on another predefined processing priority according to the predefined comparing strategy. If the operating information of the subscriber is larger than the another operating information of the subscriber, Step 207 and Step 208 are performed in turn. The operation information of the subscriber may be, for example, the durations of staying at a node of the IVR flow tree. For example, prior to the comparison, the developer may predefine the current comparing strategy as the durations of staying at a node of the IVR flow tree. If it is required to compare a node "X1Y3" with another node "X1Y2" in FIG. 2a, the lengths of durations of staying at the two nodes respectively are compared. The comparison indicates that the length of durations of staying at the node "X1Y3" is longer than the length of durations of staying at the node "X1Y2", and the processing priority of the node "X1Y3", i.e., the width information and the key information of the node "X1Y3", is acquired.

Furthermore, if the operating information of the subscriber is less than or equal to the another operating information of the subscriber, then the operation is terminated.

Furthermore, if the predefined processing priority is required to compare with a plurality of other predefined processing priorities, then Step 206, Step 207 and Step 208 are repeated until the operating information of the subscriber is less than or equal to the other operating information of the subscriber.

Step 207: Acquiring the predefined processing priority which includes a first priority and a second priority.

In this embodiment, the first priority may be the width information of the node, and the second priority may be the key information of the node.

Step 208: Adjusting the first priority and/or the second priority to the third priority higher than the first priority and/or the fourth priority higher than the second priority respectively according to the relevant information of the subscriber.

In particular, in Step 205, an adjusting strategy for a predefined processing priority is acquired if it is decided that the basic information of the subscriber conforms to a predefined value. In Step 206, operating information of a subscriber on a predefined processing priority is compared with another operating information of the subscriber on another predefined processing priority, to decide whether to adjust the predefined processing priority. The relevant information of the subscriber is sufficiently used as a basis of adjustment, to make the adjusted service information providing sequence completely conforms to the subscriber's operating habit.

Furthermore, in this embodiment, the type of the node "X1Y4" as shown in FIG. 2a is "adjustable" and "latitudinal adjustment" and the comparing strategy predefined by the developer is the durations of staying at the node. The IVR subscriber behavior analyzing platform adjusts the width information and/or the key information of the node "X1Y4" when reaching the update period predefined by the IVR subscriber behavior analyzing platform. For example, firstly, the IVR subscriber behavior analyzing platform compares the lengths of durations of staying at the node "X1Y4" and node "X1Y3" respectively. The length of durations of staying at the node "X1Y4" is longer than the length of durations of staying at the node "X1Y3", then the IVR subscriber behavior analyzing platform adjusts the node "X1Y4" to be in front of the node "X1Y3". Next, the above procedure is repeated, the IVR subscriber behavior analyzing platform compares the lengths of durations of staying at the node "X1Y4" and node "X1Y2" respectively. The length of durations of staying at the node "X1Y4" is longer than the length of durations of staying at the node "X1Y2", then the IVR subscriber behavior analyzing platform adjusts the node "X1Y4" to be in front of the node "X1Y2". In this time the arrangement sequence for the three nodes is "X1Y4", "X1Y2", "X1Y3". In this embodiment, since the type of the node "X1Y4" is "adjustable" and "latitudinal adjustment", the first priority of the node may be the width information, and the second priority of the node may be the key information. Therefore the first priority and/or the second priority may be adjusted as follows:

The width information is put ahead while keeping the key information unchanged;

The key information is put ahead while keeping the width information unchanged;

Both the width information and key information is put ahead.

The sequence of the three nodes may be adjusted to "X1Y4", "X1Y2", "X1Y3" in any of the three ways.

For example, A is a subscriber having no customized IVR flow and B is a subscriber having a customized IVR flow.

The flow entered after the subscriber A dials an IVR access number is a standard voice flow as shown in FIG. 2a.

After the subscriber B dials the IVR access number, the subscriber is prompted to press x if he wants to enter the standard IVR flow, and the default option is to enter the customized IVR flow of the subscriber. In the customized IVR flow, the subscriber is requested to select a language (i.e., the node X1Y1), and then the IVR subscriber behavior analyzing platform rearranges the nodes according to the subscriber's operating habit, wherein the node "X1Y4" with the longest length of durations being stayed at by the subscriber is rearranged at the first place.

In this embodiment, the latitudinal adjustment is performed on the processing priority of the service information "X1Y2", "X1Y3", "X1Y4" according to the relevant information of the subscriber, to make the latitudinally adjusted processing priority be ahead of the original processing priority. In this way, the procedure for service operation is simplified, the time interval for service operation is shortened, and the customization for service operation is realized.

Furthermore, this embodiment may also include Step 209 in which the adjusted processing priority is stored.

Figure 3A:
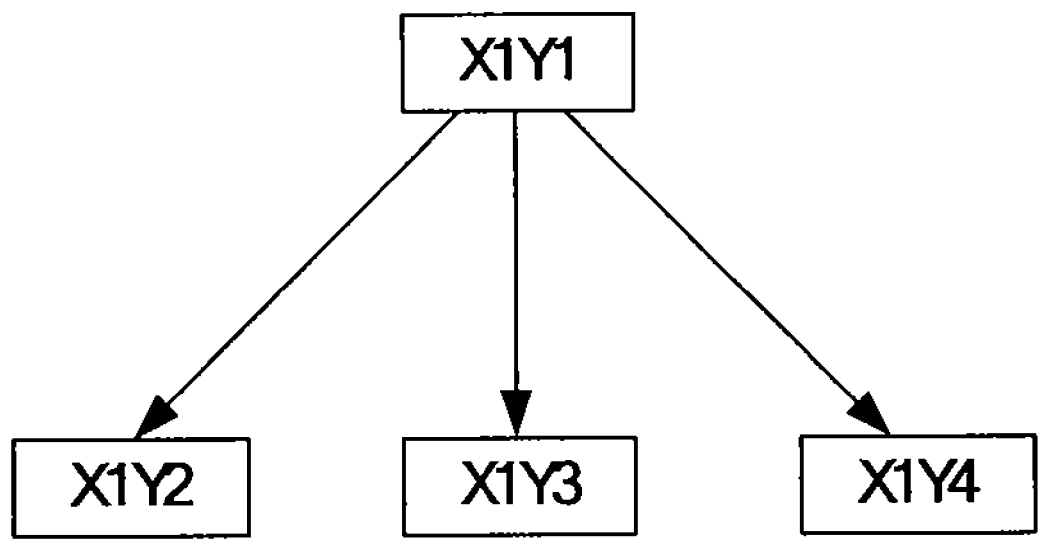
FIG. 3a is a tree diagram of processing priorities used in a method for enhancing a processing priority according to an embodiment of the present invention.
Figure 3B:
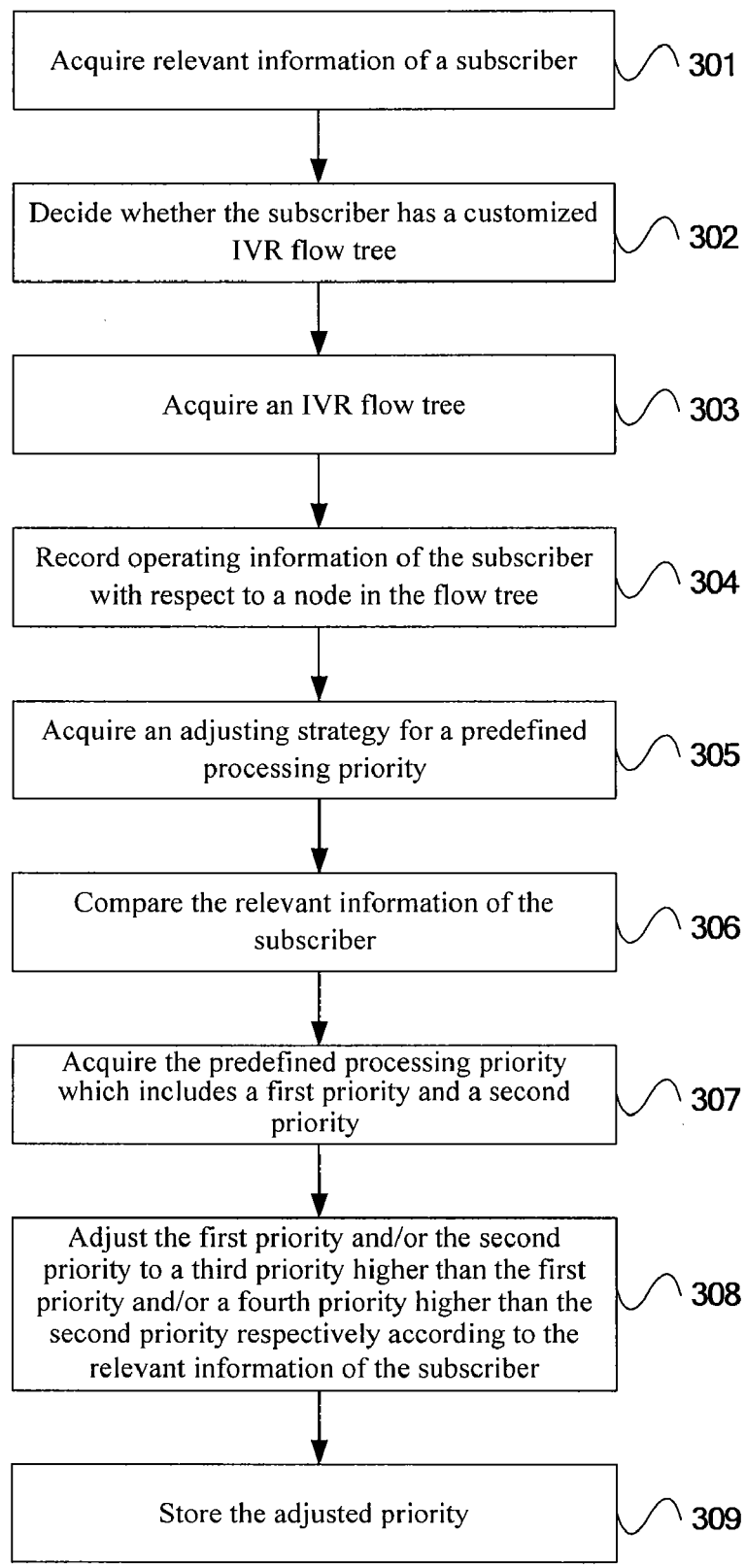
FIG. 3b is a flowchart of the method for enhancing a processing priority according to an embodiment of the present invention.

FIG. 3a is a tree diagram of processing priorities used in a method for enhancing a processing priority according to an embodiment of the present invention. FIG. 3b is a flowchart of the method for enhancing a processing priority according to the embodiment of the present invention. As shown in table 1 and FIG. 3a, the service information X1Y1 in table 1 corresponds to the parent node X1Y1 in FIG. 3a, the service information X1Y2, X1Y3 and X1Y4 in table 1 correspond to the child nodes X1Y2, X1Y3 and X1Y4 in FIG. 3a respectively.

This embodiment is similar to the embodiment of the present invention as shown in FIG. 2b, an update period is predefined, and the same operation is performed before reaching the update period. The difference lies in that: the adjusting strategy is "adjustable" and "latitudinal adjustment" in the method for enhancing a processing priority according to the embodiment of the present invention, and the adjusting strategy is "adjustable" and "longitudinal adjustment" in the method for enhancing a processing priority according to this embodiment. In this embodiment, the first priority included in the processing priority may be the width information, and the second priority included in the processing priority may be the depth information.

As shown in FIG. 3b, the embodiment of the present invention includes the following steps.

Step 301: Acquiring relevant information of a subscriber.

The relevant information of the subscriber includes basic information of the subscriber and operating information of the subscriber. The basic information of the subscriber includes, but is not limited to, one or more of: brand of the subscriber, monthly consumption of the subscriber, consumption ability of the subscriber, age of the subscriber, and frequency or the number of times that the subscriber utilized the IVR flow. The operating information of the subscriber is an operating trajectory of the subscriber recorded by the IVR subscriber behavior analyzing platform, and can be used to generate a customized IVR flow tree. The operating information of the subscriber includes, but is not limited to, one or more of: times of selecting a node, durations of staying at the node, or the percentage of the ratio of the times of selecting the node to the durations of staying at the node to the ratio of the times of selecting all nodes in the flow tree to the durations of staying at all the nodes.

In the IVR subscriber behavior analyzing platform, the relevant information of the subscriber may be acquired by retrieving information, which was recorded by the IVR subscriber behavior analyzing platform when the subscriber utilized the IVR subscriber behavior analyzing platform to inquire or handle a service, and the relevant information of the subscriber stored in the IVR subscriber behavior analyzing platform, and may also be acquired by retrieving the relevant information of the subscriber stored in other external IVR subscriber behavior analyzing platforms. The relevant information of the subscriber acquired from other external IVR subscriber behavior analyzing platforms is the date produced by other IVR subscriber behavior analyzing platforms, and may be derived from many ways such as questionnaire survey on subscribers, experience data of other external IVR subscriber behavior analyzing platforms and so on. The IVR subscriber behavior analyzing platform may introduce such data into its own database.

When the IVR subscriber behavior analyzing platform receives a communication link request from a subscriber terminal, it may receive an identifier of the subscriber terminal such as telephone number, IP address and so on. Alternatively, the subscriber may input through pressing keys its own information, such as card number, account number, identity card number or password and so on, when the subscriber uses the IVR subscriber behavior analyzing platform. The IVR subscriber behavior analyzing platform may get the relevant information of the subscriber by matching the identifier of the subscriber terminal or the information inputted by the subscriber.

Step 302: Deciding whether the subscriber has a customized IVR flow tree.

A standard IVR flow tree is the base for a customized IVR flow tree. The customized IVR flow tree may be achieved by adjusting the standard IVR flow tree according to the operating information of the subscriber. The adjustment includes latitudinal adjustment of a node and longitudinal adjustment of a node. For example, A is a subscriber having no customized IVR flow tree, and B is a subscriber having a customized IVR flow tree. In the case of entering an IVR flow tree with latitudinal adjustment of a node being enabled, the flow entered after the subscriber A dials an IVR access number is a standard voice flow, i.e. the flow is identical to the flow shown in the flowchart. On the other hand, after the subscriber B dials the IVR access number, the subscriber is prompted to press x if he wants to enter the standard flow, and the default option is to enter a customized flow. In the customized flow, the subscriber is not requested to select a language (the system has recorded the language of the subscriber), and the main menu is rearranged according to the operating habit of the subscriber with the habitual option being arranged at the first place. In the case of entering an IVR flow tree with longitudinal adjustment of a node being enabled, taking the flow of setting a coloring ring as an example, after the subscriber A downloads a coloring ring successfully, the system prompts the subscriber to select among "1: setting the coloring ring; 2: downloading another coloring ring". When the subscriber selects 1, the subscriber is further prompted to select among "1: default coloring ring; 2: individual coloring ring; 3: group coloring ring", and the system may enter an actual coloring ring setting flow only after the further selection is made by the subscriber. It was most probable (the probability is no lower than a predefined value such as 50%) for the subscriber B to set a downloaded coloring ring as an individual coloring ring each time he downloaded the coloring ring; therefore, when the subscriber B downloads a coloring ring successfully, the system prompt may become "3: setting as individual coloring ring; 1: setting the coloring ring; 2: downloading another coloring ring", in this way, one selecting step of the subscriber may be avoided.

Whether a subscriber has a customized IVR flow tree is decided according to the relevant information of the subscriber. Particularly, items in the basic information of the subscriber are combined as a deciding condition for performing the decision, for example, the brand used by the subscriber and the frequency of using the IVR flow by the subscriber as indicated in the basic information of the subscriber may be combined as the deciding condition. For example, the subscriber need to be a subscriber of Gotone and the number of monthly use times of the subscriber need to be larger than 5. Furthermore, assuming that the period for updating the IVR flow tree is one month and it is December now, and there are four subscribers A, B, C, D: A, B, C are subscribers of Gotone while D is not; A used the IVR flow more than 5 times in March and on longer used the IVR flow more than 5 times monthly in subsequent months; B never used the IVR flow more than 5 times monthly; and C used the IVR flow more than 5 times in every month. In the above case, there is no record for B or D in the customized IVR subscriber behavior analyzing platform; the customized IVR flow tree for A is constant from April to December, and is generated according to the use data of March; C has a respective customized IVR flow tree in each month from April to December, with the potentially different customized IVR flow tree used in each month being generated according to the use data of the previous month.

If the basic information of the subscriber conforms to the deciding condition, the subscriber has a customized IVR flow tree. If one or more items in the basic information of the subscriber do not conform to the deciding condition, a standard IVR flow tree is presented to the subscriber. After the decision is made, the IVR subscriber behavior analyzing platform returns the deciding result to the subscriber terminal.

Further, in order to save system resources, if a subscriber has ever successfully possessed a customized IVR flow tree once, the IVR subscriber behavior analyzing platform may no longer perform the decision on whether the subscriber has a customized IVR flow tree thereafter.

Step 303: Acquiring an IVR flow tree.

According to the deciding result in step 302, the IVR subscriber behavior analyzing platform acquires attribution information of each node in the IVR flow tree of the subscriber, and the attribution information may include depth information, width information, key information, operating information of the subscriber, type information, and identification information of parent node. The IVR subscriber behavior analyzing platform reads the attribution information of each node in the IVR flow tree to provide the subscriber with corresponding IVR flow services.

It should be noted that the IVR subscriber behavior analyzing platform in the embodiment performs longitudinal adjustment on a node by adjusting the width information and/or the depth information of the node.

There are various ways for the IVR subscriber behavior analyzing platform to make a subscriber enter a customized IVR flow tree. For example, the IVR subscriber behavior analyzing platform may let the subscriber select an IVR flow tree enter and then provide a corresponding IVR flow tree to the subscriber according to the subscriber's selection; the IVR subscriber behavior analyzing platform may provide a customized IVR flow tree to the subscriber directly without a selection by the subscriber; alternatively, when the subscriber is using a standard IVR flow tree or a customized IVR flow tree, the IVR subscriber behavior analyzing platform may provide a shortcut key for switching between the standard IVR flow tree and the customized IVR flow tree as need.

Furthermore, when the IVR subscriber behavior analyzing platform is acquiring the standard IVR flow tree or the customized IVR flow tree, the subscriber is enabled to switch between the standard IVR flow tree and the customized IVR flow tree.

Step 304: Recording operating information of the subscriber with respect to a node in the flow tree.

After the IVR subscriber behavior analyzing platform acquires an IVR flow tree corresponding to the subscriber, it provides inquiry and service information to the subscriber according to the position of each node in the IVR flow tree. When the subscriber uses the IVR flow tree, the IVR subscriber behavior analyzing platform may record the frequency of using each node by the subscriber; in particular, the frequency of using each node by the subscriber may be recorded in the subscriber's operating information of the attribution information of the node. For example, the operating trajectory of the subscriber on each node, including but not limited to historical keys, times of selecting the node, durations of staying at the node, is recorded in the IVR subscriber behavior analyzing platform as the relevant information of the subscriber.

Step 305: Acquiring an adjusting strategy for a predefined processing priority.

In particular, when an update period is reached, it is decided whether the brand of the subscriber, the monthly consumption of the subscriber, the consumption ability of the subscriber, the age of the subscriber, the frequency or times that the subscriber utilized the IVR flow and so on in the basic information of the subscriber conform to predefined values. If the basic information of the subscriber conform to the predefined values, an adjusting strategy for a single node in the IVR flow tree is acquired to adjust a first priority and/or a second priority to a third priority and/or a fourth priority respectively according to the relevant information of the subscriber.

The update period is predefined by a developer. The update period may be a period of time such as one week, one month, and may also be the number of login times of a subscriber, for example, the predefined processing priority is adjusted when the subscriber logs in for every fifth time. The adjusting strategy is predefined by the developer. The adjusting strategy includes three types: "unadjustable", "adjustable" and "latitudinal adjustment", or "adjustable" and "longitudinal adjustment". Each node corresponds uniquely to one type of adjusting strategy. For example, in a bank self-help voice system, the two nodes for requesting a subscriber to input card number and password are "unadjustable" nodes. The node for deposit service and the node for transfer service may be preset to be "adjustable" and "latitudinal adjustment", or preset to be "adjustable" and "longitudinal adjustment" by the developer. For example, as shown in FIG. 3a, the original arrangement of the child nodes is "X1Y1", "X1Y3", "X1Y4". The adjusting strategies of the three nodes are "adjustable" and "latitudinal adjustment". Therefore, the sequence of the three nodes may be rearranged in any way according to a subscriber's operating habit. For example, as shown in FIG. 3a, the adjusting strategy of the node "X1Y2" is "adjustable" and "longitudinal adjustment", and the node "X1Y2" may be adjusted to a position at the same depth as the node "X1Y1" according to a subscriber's operating habit Furthermore, in the adjusting strategy of "adjustable" and "longitudinal adjustment", the depth of a node may be adjusted upwards for at least one position.

Furthermore, if one or more items in the basic information of the subscriber do not conform to the predefined values, the operation is terminated.

Step 306: Comparing the relevant information of the subscriber.

The developer may predefine a comparing strategy, i.e., an advantage comparing condition.

In particular, operating information of a subscriber on a predefined processing priority is compared with another operating information of the subscriber on another predefined processing priority according to the predefined comparing strategy. If the operating information of the subscriber is larger than the another operating information of the subscriber, Step 307 and Step 308 are performed in turn. For example, prior to the comparison, the developer may predefine the current comparing strategy as the durations of staying at a node of the IVR flow tree. If it is required to compare a node "X1Y2" with another node "X1Y1" in FIG. 3a, the lengths of durations of staying at the two nodes respectively are compared. The comparison indicates that the length of durations of staying at the node "X1Y2" is longer than the length of durations of staying at the node "X1Y1", and the processing priority of the node "X1Y2", i.e., the width information and the depth information of the node "X1Y2", is acquired.

Furthermore, if the operating information of the subscriber is less than or equal to the another operating information of the subscriber, then the operation is terminated.

Furthermore, if the predefined processing priority is required to compare with a plurality of other predefined processing priorities, then Step 306, Step 307 and Step 308 are repeated until the operating information of the subscriber is less than or equal to the other operating information of the subscriber.

Step 307: Acquiring the predefined processing priority which includes a first priority and a second priority.

In this embodiment, the first priority may be the width information of the node, the second priority may be the depth information of the node.

Step 308: Adjusting the first priority and/or the second priority to the third priority higher than the first priority and/or the fourth priority higher than the second priority respectively according to the relevant information of the subscriber.

In particular, in Step 305, an adjusting strategy for a predefined processing priority is acquired if it is decided that the basic information of the subscriber conforms to a predefined value. In Step 206, operating information of the subscriber on a predefined processing priority is compared with another operating information of the subscriber on another predefined processing priority, to decide whether to adjust the predefined processing priority. The relevant information of the subscriber is sufficiently used as a basis of adjustment, to make the adjusted service information providing sequence completely conforms to the subscriber's operating habit.

Furthermore, in this embodiment, the type of the node "X1Y2" as shown in FIG. 3a is "adjustable" and "longitudinal adjustment" and the comparing strategy predefined by the developer is the durations of staying at the node. The IVR subscriber behavior analyzing platform adjusts the width information and/or the depth information of the node "X1Y2" when reaching the update period predefined by the IVR subscriber behavior analyzing platform. For example, the IVR subscriber behavior analyzing platform compares the lengths of durations of staying at the node "X1Y2" and node "X1Y1" respectively. The length of durations of staying at the node "X1Y2" is longer than the length of durations of staying at the node "X1Y1", then the IVR subscriber behavior analyzing platform adjusts the node "X1Y2" to a position at the same layer as the node "X1Y1". In this embodiment, since the type of the node "X1Y2" is "adjustable" and "longitudinal adjustment", the first priority of the node may be the width information, and the second priority of the node may be the depth information. Therefore the first priority and/or the second priority may be adjusted as follows:

The depth information is put ahead while keeping the width information unchanged;

Both the width information and depth information is adjusted.

The kind of "adjustable" and "longitudinal adjustment" may also include: the operations performed by the IVR subscriber behavior analyzing platform may be to add a new node or to delete the original node after adding the new node.

For example, A is a subscriber having no customized IVR flow and B is a subscriber having a customized IVR flow.

The flow entered after the subscriber A dials an IVR access number is a standard voice flow as shown in FIG. 3a.

After the subscriber B dials the IVR access number, the subscriber is prompted to press x if he wants to enter the standard flow, and the default option is to enter the customized IVR flow of the subscriber. In the customized IVR flow, the IVR subscriber behavior analyzing platform rearranges the nodes according to the subscriber's operating habit, wherein the node "X1Y2" at which the subscriber stays for the longest time is rearranged at the same depth as the node "X1Y1", in this way, one step may be saved for the subscriber's selecting operations.

After adjusting the node "X1Y2" to be at the same depth as the node "X1Y1", the IVR subscriber behavior analyzing platform may maintain the node "X1Y2" in the original position or delete the node "X1Y2" from the original position.

In this embodiment, the longitudinal adjustment is performed on the processing priority of the service information "X1Y1" and "X1Y2" according to the relevant information of the subscriber, to make the longitudinally adjusted processing priority be ahead of the original processing priority. In this way, the procedure for service operation is simplified, the time interval for service operation is shortened, and the customization for service operation is realized.

Furthermore, this embodiment may also include Step 309 in which the adjusted processing priority is stored.

Figure 4:
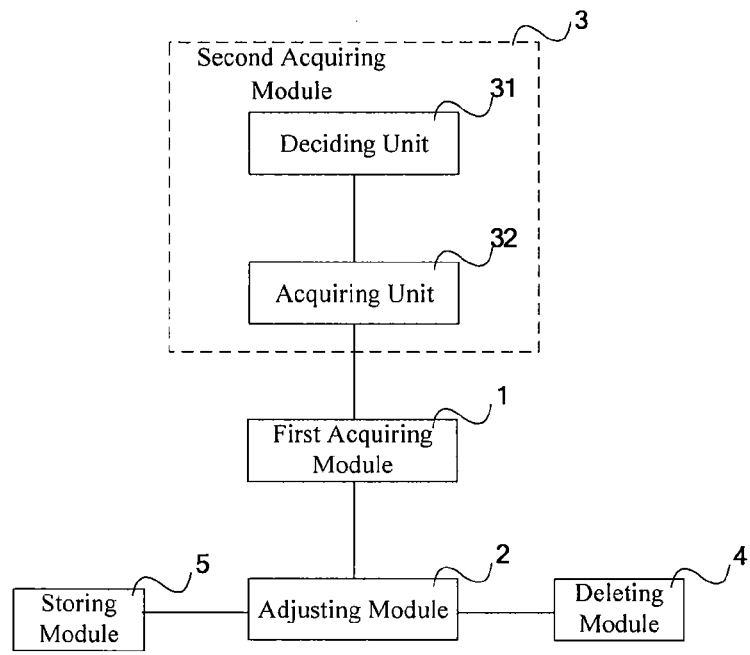
FIG. 4 is a block diagram of an apparatus for enhancing a processing priority according to an embodiment of the present invention.

FIG. 4 is a block diagram of an apparatus for enhancing a processing priority according to an embodiment of the present invention. As shown in FIG. 4, the apparatus of the embodiment includes a first acquiring module 1 and an adjusting module 2 which are connected sequentially. The first acquiring module 1 is adapted to acquire a predefined processing priority which includes a first priority and a second priority. The adjusting module 2 is adapted to adjust the first priority and/or the second priority to a third priority higher than the first priority and/or a fourth priority higher than the second priority respectively according to relevant information of a subscriber.

The apparatus of the embodiment further includes a second acquiring module 3 which is connected to the first acquiring module 1 and is adapted to acquire an adjusting strategy for the predefined processing priority so as to adjust the first priority and/or the second priority to the third priority and/or the fourth priority respectively according to the relevant information of the subscriber.

The second acquiring module 3 of this embodiment further includes a deciding unit 31 and an acquiring unit 32 which are connected sequentially. The acquiring unit 32 is connected to the first acquiring module 1. The deciding unit 31 is adapted to decide whether basic information of the subscriber conforms to a predefined value when reaching an update period. The acquiring unit 32 is adapted to acquire the adjusting strategy for the predefined processing priority.

In this embodiment, in the operation of the apparatus for enhancing a processing priority, when the predefined update period is reached, the deciding unit 31 decides whether brand of the subscriber, monthly consumption of the subscriber, consumption ability of the subscriber, age of the subscriber and so on in the basic information of the subscriber conform to predefined values. If the decision is positive, the acquiring unit 32 acquires an adjusting strategy for the predefined processing priority to be used to adjust the first priority and/or the second priority to the third priority and/or the fourth priority respectively according to the relevant information of the subscriber. Thereafter, the first acquiring module 1 acquires the predefined processing priority which includes the first priority and the second priority. Finally, the adjusting module 2 adjusts the first priority and/or the second priority to the third priority higher than the first priority and/or the fourth priority higher than the second priority respectively according to the relevant information of the subscriber.

Furthermore, after the adjustment of the processing priority is completed, the apparatus for enhancing a processing priority in this embodiment may maintain the predefined processing priority or delete the predefined processing priority by a deleting module 4. The adjusted priority is stored by a storing module 5.

In this embodiment, a processing priority of a service is adjusted according to the relevant information of the subscriber, so that the adjusted processing priority is higher than the predefined processing priority; therefore, it can provide different subscribers with customized service information providing sequences according to their operation habits. In this way, the procedure for service operation is simplified, the time interval for service operation is shortened, and the customization for service operation is realized.

An embodiment provides a service platform for providing service information inquiry and processing which includes the apparatus for enhancing a processing priority on a basis of the embodiment as shown in FIG. 4. The service platform may include an IPTV service platform, an IVR service platform, a telephone bank service platform and so on.

Figure 5:
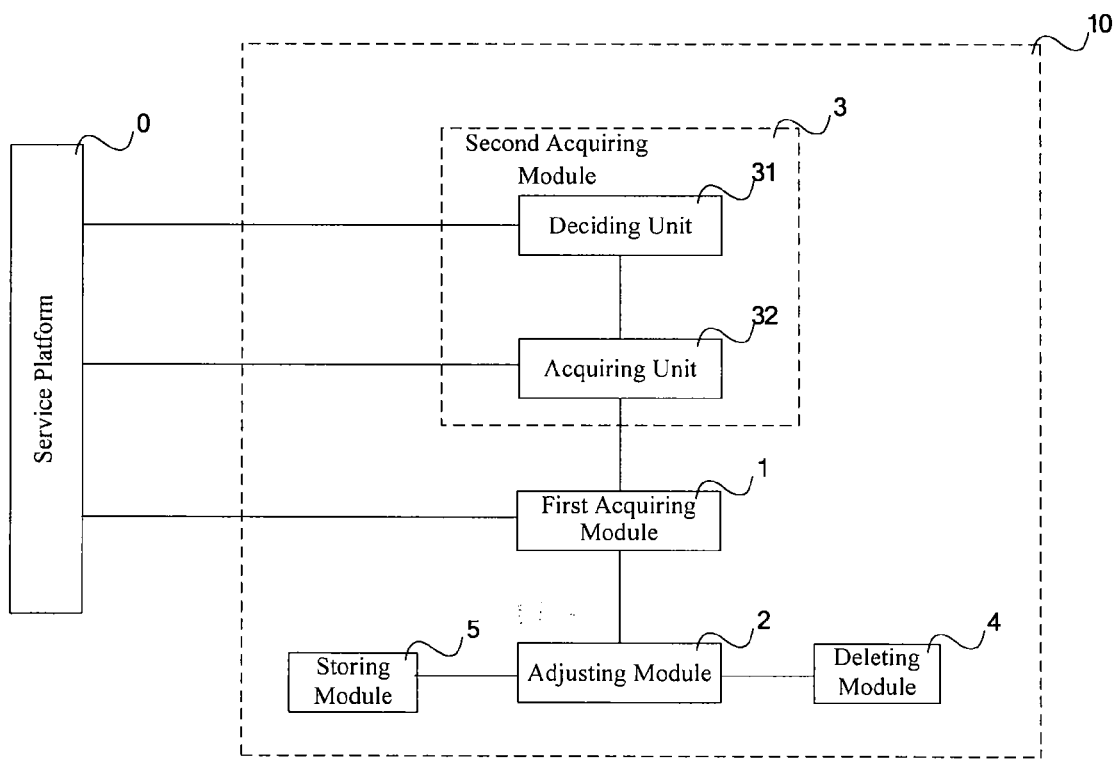
FIG. 5 is a block diagram of a system for enhancing a processing priority according to an embodiment of the present invention.

FIG. 5 is a block diagram of a system for enhancing a processing priority according to the embodiment of the present invention. As shown in FIG. 5, the system of the embodiment includes an apparatus for enhancing a processing priority 10 and a service platform 0. The apparatus for enhancing a processing priority 10 includes a first acquiring module 1 and an adjusting module 2 which are connected sequentially and connected to the service platform 0 respectively. The first acquiring module 1 is adapted to acquire a predefined processing priority which includes a first priority and a second priority. The adjusting module 2 is adapted to adjust the first priority and/or the second priority to a third priority higher than first priority and/or a fourth priority higher than second priority respectively according to relevant information of the subscriber. The service platform 0 is adapted to extract service information sequentially according to the predefined processing priorities and to provide operating information of the subscriber to the apparatus for enhancing a processing priority 10.

The embodiment further includes a second acquiring module 3 which is connected to the first acquiring module 1 and the service platform 0 and is adapted to acquire an adjusting strategy for the predefined processing priority The second acquiring module 3 of this embodiment further includes a deciding unit 31 and an acquiring unit 32 which are connected sequentially and connected to the service platform 0 respectively. The acquiring unit 32 is connected to the first acquiring module 1. The deciding unit 31 is adapted to decide whether basic information of the subscriber conforms to a predefined value when reaching an update period. The acquiring unit 32 is adapted to acquire the adjusting strategy for the predefined processing priority.

In this embodiment, in the operation of the system for enhancing a processing priority, when the predefined update period is reached, the deciding unit 31 decides whether the basic information of the subscriber provided by the service platform 0 conforms to predefined values. If the decision is positive, the acquiring unit 32 acquires from the service platform 0 an adjusting strategy for the predefined processing priority to be used to adjust the first priority and/or the second priority to the third priority and/or the fourth priority respectively according to the relevant information of the subscriber. Thereafter, the first acquiring module 1 acquires from the service platform 0 the predefined processing priority which includes the first priority and the second priority. Finally, the adjusting module 2 adjusts the first priority and/or the second priority to the third priority higher than the first priority and/or the fourth priority higher than the second priority respectively according to the relevant information of the subscriber.

Furthermore, after the adjustment of the processing priority is completed, the system for enhancing a processing priority in this embodiment may maintain the predefined processing priority or delete the predefined processing priority by a deleting module 4. The adjusted priority is stored by a storing module 5.

In this embodiment, a processing priority of a service is adjusted according to the relevant information of the subscriber, so that the adjusted processing priority is higher than the predefined processing priority; therefore, it can provide different subscribers with customized service information providing sequences according to their operation habits. In this way, the procedure for service operation is simplified, the time interval for service operation is shortened, and the customization for service operation is realized.

Figure 6:
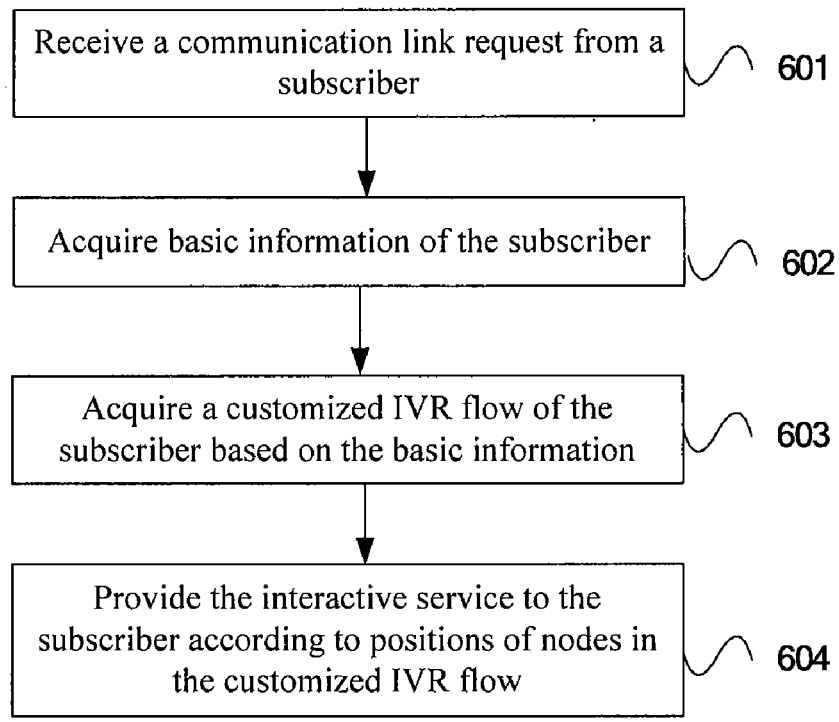
FIG. 6 is a flowchart of a method for implementing an interactive service according to an embodiment of the present invention.

FIG. 6 illustrates a method for implementing an interactive service according to an embodiment of the present invention. The method includes the following steps.

Step 601: Receiving a communication link request from a subscriber.

Step 602: Acquiring basic information of the subscriber.

Step 603: Acquiring a customized IVR flow of the subscriber based on the basic information, wherein the customized IVR flow being generated based on operating information of the subscriber.

Step 604: Providing the interactive service to the subscriber according to positions of nodes in the customized IVR flow.

Furthermore, the method includes generating the customized IVR flow based on the operating information of the subscriber.

Further, the generating the customized IVR flow based on the operating information of the subscriber specifically includes: acquiring adjusting strategies for respective nodes in an IVR flow tree and the operating information of the subscribe; performing comparison among the respective nodes based on the operating information and the adjusting strategies; acquiring a processing priority of the subscriber, wherein the processing priority including a first priority and a second priority; adjusting the first priority to a third priority and/or adjusting the second priority to a fourth priority based on the comparison, wherein the third priority being higher than the first priority, and the fourth priority being higher than the second priority; generating the customized IVR flow based on the adjusted priority.

Furthermore, the basic information of the subscriber includes at least one of: brand of the subscriber, monthly consumption of the subscriber, consumption ability of the subscriber, and age of the subscriber.

The operating information of the subscriber includes at least one of: times of selecting a service corresponding to the predefined processing priority; durations of selecting the service corresponding to the predefined processing priority; and a percentage of a ratio between the times and the durations of selecting a service corresponding to a single predefined processing priority to a ratio between the times and the durations of selecting services corresponding to all predefined processing priorities.

Figure 7:
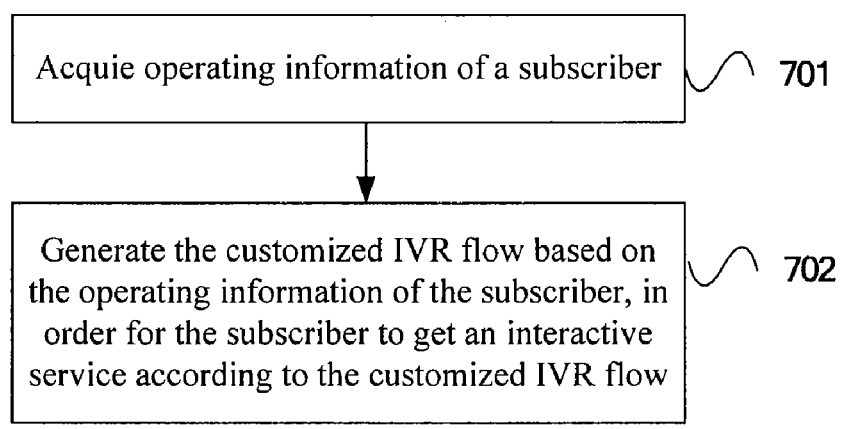
FIG. 7 is a flowchart of a method for generating a customized IVR flow according to an embodiment of the present invention.

FIG. 7 illustrates a method for generating a customized IVR flow according to an embodiment of the present invention. The method includes the following steps.

Step 701: Acquiring operating information of a subscriber.

Step 702: Generating the customized IVR flow based on the operating information of the subscriber, in order for the subscriber to get an interactive service according to the customized IVR flow.

Furthermore, the operating information includes at least one of: times of selecting a service corresponding to the predefined processing priority; durations of selecting the service corresponding to the predefined processing priority; and a percentage of a ratio between the times and the durations of selecting a service corresponding to a single predefined processing priority to a ratio between the times and the durations of selecting services corresponding to all predefined processing priorities.

Figure 8:
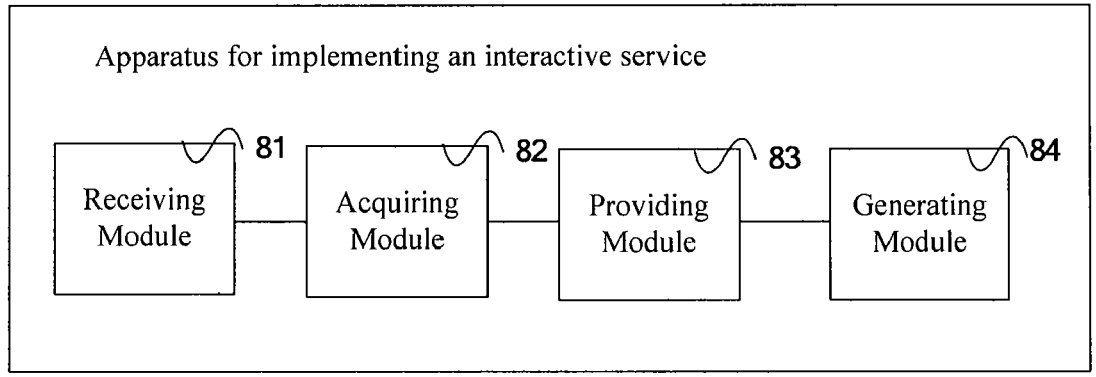
FIG. 8 is a block diagram of an apparatus for implementing an interactive service according to an embodiment of the present invention.

FIG. 8 illustrates an apparatus for implementing an interactive service according to an embodiment of the present invention. The apparatus includes: a receiving module 81 adapted to receive a communication link request from a subscriber; an acquiring module 82 adapted to acquire basic information of the subscriber, and acquire a customized IVR flow of the subscriber based on the basic information, wherein the customized IVR flow being generated based on operating information of the subscriber; a providing module 83 adapted to provide the interactive service to the subscriber according to positions of nodes in the customized IVR flow.

Furthermore, the apparatus includes a generating module 84 adapted to generate the customized IVR flow based on the operating information of the subscriber.

Furthermore, the generating module is specifically adapted to: acquire adjusting strategies for respective nodes in an IVR flow tree and the operating information of the subscribe; perform comparison among the respective nodes based on the operating information and the adjusting strategies; acquire a processing priority of the subscriber, wherein the processing priority including a first priority and a second priority; adjust the first priority to a third priority and/or adjust the second priority to a fourth priority based on the comparison, wherein the third priority being higher than the first priority, and the fourth priority being higher than the second priority; generate the customized IVR flow based on the adjusted priority.

Figure 9:
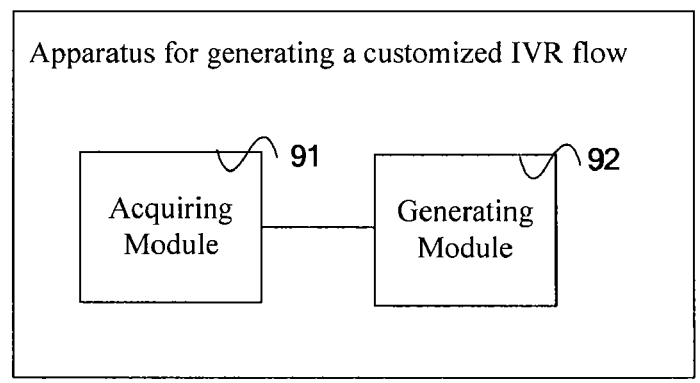
FIG. 9 is a block diagram of an apparatus for generating a customized IVR flow according to an embodiment of the present invention.

FIG. 9 illustrates an apparatus for generating a customized IVR flow according to an embodiment of the present invention. The apparatus includes: an acquiring module 91 adapted to acquire operating information of a subscriber; a generating module 92 adapted to generate the customized IVR flow based on the operating information of the subscriber, in order for the subscriber to get an interactive service according to the customized IVR flow.

Furthermore, the operating information includes at least one of: times of selecting a service corresponding to the predefined processing priority; durations of selecting the service corresponding to the predefined processing priority; and a percentage of a ratio between the times and the durations of selecting a service corresponding to a single predefined processing priority to a ratio between the times and the durations of selecting services corresponding to all predefined processing priorities.

Figure 10:
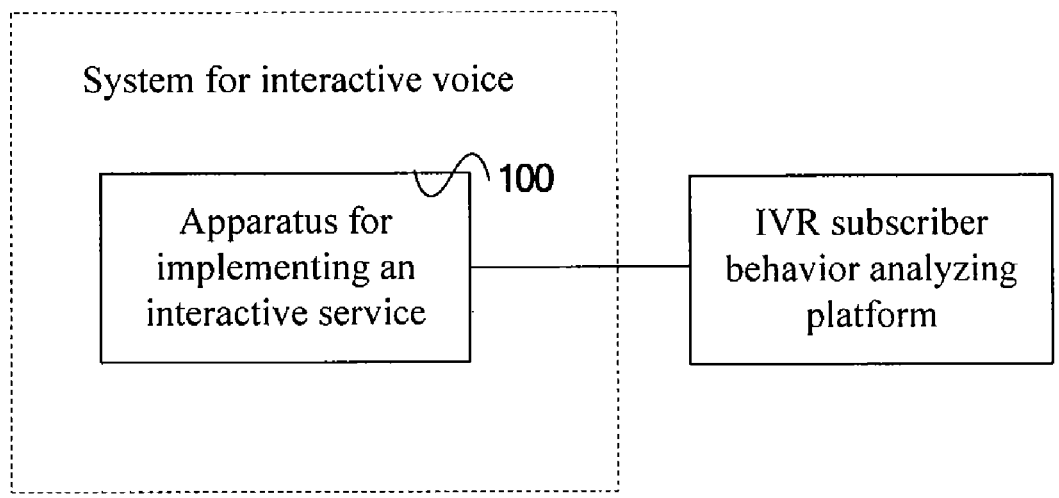
FIG. 10 is a block diagram of a system for interactive voice according to an embodiment of the present invention.

FIG. 10 illustrates a system for interactive voice according to an embodiment of the present invention. The system includes an apparatus 100 for implementing an interactive service, the apparatus 100 is adapted to: receive a communication link request from a subscriber, send an inquiry request to an IVR subscriber behavior analyzing platform to determine whether the subscriber has a customized IVR flow, wherein the customized IVR flow being generated based on operating information of the subscriber; receive the customized IVR flow, which is sent by the IVR subscriber behavior analyzing platform when the IVR subscriber behavior analyzing platform determines that the subscriber has the customized IVR flow; provide the interactive service to the subscriber according to the customized IVR flow. The IVR subscriber behavior analyzing platform is adapted to receive the inquiry request from the apparatus for implementing an interactive service, and send the customized IVR flow to the apparatus for implementing an interactive service when determining that the subscriber has the customized IVR flow.

It should be understood by those with ordinal skills in this art that all or a portion of steps in the above mentioned method embodiments may be implemented by program instructions executed in hardware. The program may be stored in a computer readable storage medium. The program, when executed, causes the hardware to perform the steps of the above mentioned method embodiments. The storage medium includes ROM, RAM, magnetic disk, optical disk or other media that can store program codes.

It should be noted that the above mentioned embodiments are only to illustrate but not limit the technical solutions of the present invention. Although the present invention is discussed in detail with reference to the above embodiments, it is apparent for those with ordinal skills in this art that various modifications can be made on the technical solutions of the embodiments or substitution can be made to a portion of features, without departing from the spirit and scope of the present invention.

What is claimed is:

1. A method for implementing an interactive service, comprising:
    receiving a communication link request from a subscriber;
    acquiring basic information of the subscriber;
    acquiring a customized Interactive Voice Response (IVR) flow of the subscriber based on the basic information, wherein the customized IVR flow is generated based on operating information of the subscriber;
    providing the interactive service to the subscriber according to positions of nodes in the customized IVR flow; and
    generating the customized IVR flow based on the operating information of the subscriber;
    wherein the generating the customized IVR flow based on the operating information of the subscriber comprises:
        acquiring adjusting strategies for respective nodes in an IVR flow tree and the operating information of the subscribe; wherein the adjusting strategy is "adjustable" and "latitudinal adjustment", so that a node can be adjusted at a position at the same depth as another node;
        performing comparison among the respective nodes based on the operating information and the adjusting strategies;
        acquiring a processing priority of the subscriber, wherein the processing priority including a first priority and a second priority;
            adjusting the second priority to a fourth priority based on the comparison, wherein the third priority is higher than the first priority, and the fourth priority is higher than the second priority;
            generating the customized IVR flow based on the adjusted priority; and
        the operating information comprises a percentage of a ratio between the times and the durations of selecting a service corresponding to a single predefined processing priority to a ratio between the times and the durations of selecting services corresponding to all predefined processing priorities.

2. The method of claim 1, wherein the basic information of the subscriber comprises at least one of: brand of the subscriber, monthly consumption of the subscriber, consumption ability of the subscriber, and age of the subscriber;
    the operating information of the subscriber comprises at least one of:
    times of selecting a service corresponding to a predefined processing priority.

3. A method for generating a customized Interactive Voice Response (IVR) flow, comprising:
    acquiring operating information of a subscriber; and
    generating the customized IVR flow based on the operating information of the subscriber, in order for the subscriber to get an interactive service according to the customized IVR flow;
    wherein the step of generating the customized IVR flow based on the operating information of the subscriber comprises:
        acquiring adjusting strategies for respective nodes in an IVR flow tree and the operating information of the subscriber, wherein the adjusting strategy is "adjustable" and "latitudinal adjustment", so that a node can be adjusted at a position at the same depth as another node;
        performing comparison among the respective nodes based on the operating information and the adjusting strategies;
        acquiring a processing priority of the subscriber, wherein the processing priority including a first priority and a second priority;
        adjusting the first priority to a third priority and/or adjusting the second priority to a fourth priority based on the comparison, wherein the third priority is higher than the first priority, and the fourth priority is higher than the second priority; and
        generating the customized IVR flow based on the adjusted priority;
        and wherein the operating information comprises a percentage of a ratio between the times and the durations of selecting a service corresponding to a single predefined processing priority to a ratio between the times and the durations of selecting services corresponding to all predefined processing priorities.

4. The method of claim 3, wherein the operating information comprises at least one of:
    times of selecting a service corresponding to a predefined processing priority.

5. An apparatus for implementing an interactive service, comprising:
    a receiving module adapted to receive a communication link request from a subscriber;
    an acquiring module adapted to acquire basic information of the subscriber, and acquire a customized Interactive Voice Response (IVR) flow of the subscriber based on the basic information, wherein the customized IVR flow being generated based on operating information of the subscriber;
    a providing module adapted to provide the interactive service to the subscriber according to positions of nodes in the customized IVR flow;
    a generating module adapted to generate the customized IVR flow based on the operating information of the subscriber; and acquire adjusting strategies for respective nodes in an IVR flow tree and the operating information of the subscribe; wherein the adjusting strategy is "adjustable" and "latitudinal adjustment", so that a node can be adjusted at a position at the same depth as another node;
    perform comparison among the respective nodes based on the operating information and the adjusting strategies;
    acquire a processing priority of the subscriber, herein the processing priority includes a first priority and a second priority;
    adjust the first priority to a third priority and/or adjust the second priority to a fourth priority based on the comparison, wherein the third priority is higher than the first priority, and the fourth priority is higher than the second priority; and
    generate the customized IVR flow based on the adjusted priority; and
    wherein the operating information comprises a percentage of a ratio between the times and the durations of selecting a service corresponding to a single predefined processing priority to a ratio between the times and the durations of selecting services corresponding to all predefined processing priorities.

6. An apparatus for generating a customized Interactive Voice Response (IVR) flow, comprising:
   an acquiring module adapted to acquire operating information of a subscriber;
   a generating module adapted to generate the customized IVR flow based on the operating information of the subscriber, in order for the subscriber to get an interactive service according to the customized IVR flow, acquire adjusting strategies for respective nodes in an IVR flow tree and the operating information of the subscribe; wherein the adjusting strategy is "adjustable" and "latitudinal adjustment", so that a node can be adjusted at a position at the same depth as another node;
   perform comparison among the respective nodes based on the operating information and the adjusting strategies;
   acquire a processing priority of the subscriber, wherein the processing priority includes a first priority and a second priority;
   adjust the first priority to a third priority and/or adjust the second priority to a fourth priority based on the comparison, wherein the third priority is higher than the first priority, and the fourth priority is higher than the second priority; and
   generate the customized IVR flow based on the adjusted priority; and
   wherein the operating information comprises a percentage of a ratio between the times and the durations of selecting a service corresponding to a single predefined processing priority to a ratio between the times and the durations of selecting services corresponding to all predefined processing priorities.

7. The apparatus of claim 6, wherein the operating information comprises at least one of:
   times of selecting a service corresponding to a predefined processing priority.

* * * * *

UNITED STATES PATENT AND TRADEMARK OFFICE
CERTIFICATE OF CORRECTION

| | |
|---|---|
| PATENT NO. | : 8,259,913 B2 |
| APPLICATION NO. | : 12/604011 |
| DATED | : September 4, 2012 |
| INVENTOR(S) | : Xiaoli Wang |

Page 1 of 1

It is certified that error appears in the above-identified patent and that said Letters Patent is hereby corrected as shown below:

In the Claims

In column 20, claim 5, line 54, after "of the subscriber," replace "herein" with --wherein--.

Signed and Sealed this
Twenty-seventh Day of November, 2012

David J. Kappos
*Director of the United States Patent and Trademark Office*